US011824230B2

(12) United States Patent
Law et al.

(10) Patent No.: US 11,824,230 B2
(45) Date of Patent: Nov. 21, 2023

(54) METHOD FOR OPERATING AN ENERGY SUPPLY DEVICE

(71) Applicant: MTU Aero Engines AG, Munich (DE)

(72) Inventors: Barnaby Law, Starnberg (DE); Ann-Kathrin Henss, Munich (DE)

(73) Assignee: MTU Aero Engines AG, Munich (DE)

( * ) Notice: Subject to any disclaimer, the term of this patent is extended or adjusted under 35 U.S.C. 154(b) by 0 days.

(21) Appl. No.: 17/693,628

(22) Filed: Mar. 14, 2022

(65) Prior Publication Data

US 2022/0302471 A1 Sep. 22, 2022

(30) Foreign Application Priority Data

Mar. 16, 2021 (DE) ...................... 10 2021 202 540.4

(51) Int. Cl.
*H01M 8/0247* (2016.01)
*H01M 8/0232* (2016.01)
*H01M 8/043* (2016.01)

(52) U.S. Cl.
CPC ....... *H01M 8/0247* (2013.01); *H01M 8/0232* (2013.01); *H01M 8/043* (2016.02); *H01M 2250/20* (2013.01)

(58) Field of Classification Search
CPC ........... H01M 8/04052; H01M 8/0247; H01M 8/0232; H01M 8/043
See application file for complete search history.

(56) References Cited

U.S. PATENT DOCUMENTS

| 4,537,839 A | 8/1985 | Cameron |
| 7,901,821 B2 | 3/2011 | Buchi et al. |
| 2016/0059216 A1* | 3/2016 | Qi ........................ B01J 35/0013 502/340 |

FOREIGN PATENT DOCUMENTS

| DE | 10257212 A1 | 6/2004 |
| JP | H0622155 B2 | 3/1994 |
| WO | 0245247 A2 | 6/2002 |

* cited by examiner

*Primary Examiner* — Sarah A. Slifka
(74) *Attorney, Agent, or Firm* — Hinckley, Allen & Snyder, LLP; David R. Josephs

(57) ABSTRACT

The invention relates to an energy supply device with at least one fuel cell and to a method for operating at least one energy supply device with at least one fuel cell, which has at least one anode that can be supplied with a fuel and at least one cathode that can be supplied with ambient air for generating electrical energy. The proposed energy supply device has a converter device.

8 Claims, 2 Drawing Sheets

METHOD FOR OPERATING AN ENERGY SUPPLY DEVICE

BACKGROUND OF THE INVENTION

Figure 1:
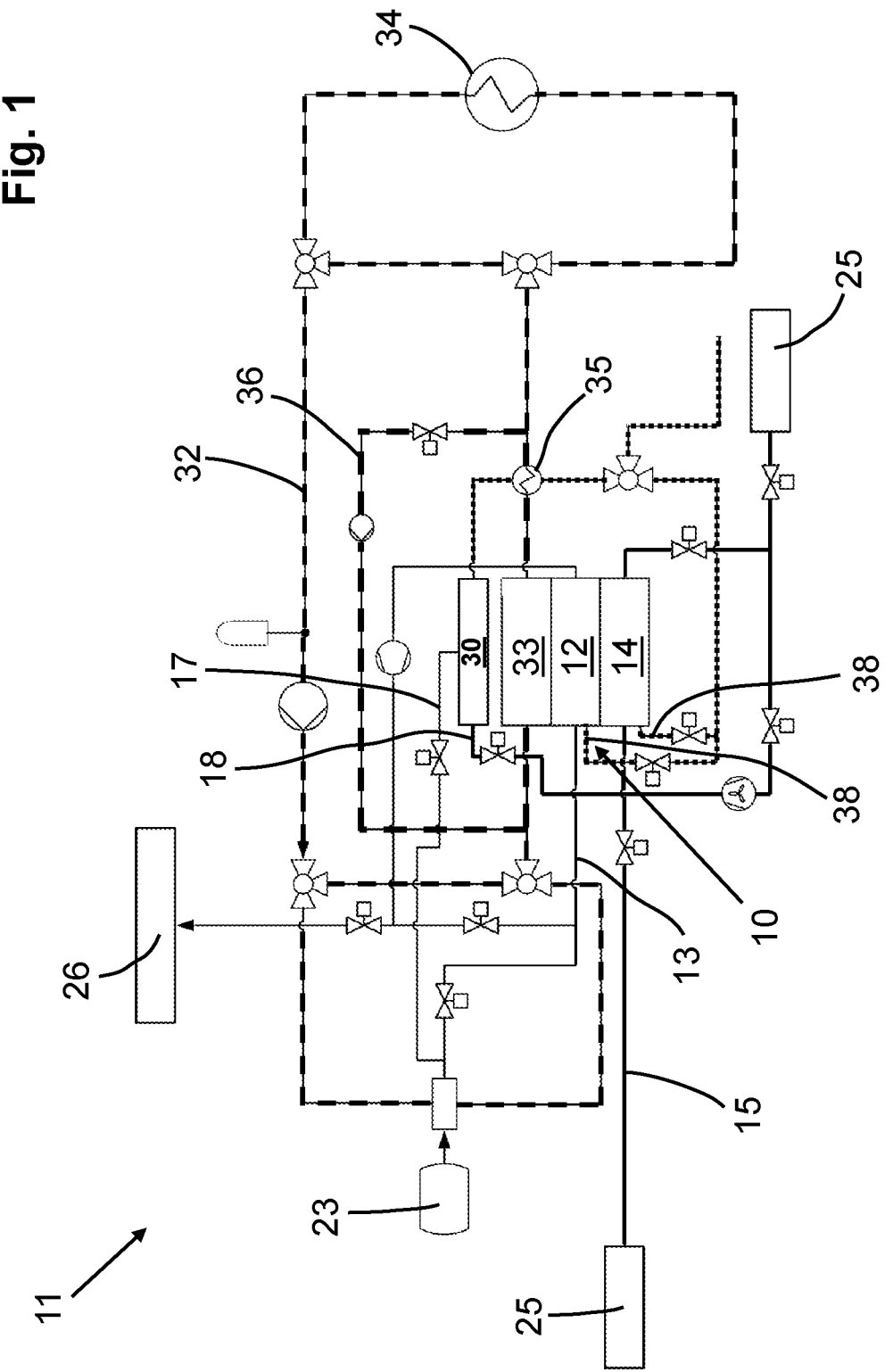

The invention relates to a method for operating an energy supply device and to an energy supply device with at least one fuel cell, which has at least one anode that can be supplied with a fuel and at least one cathode that can be supplied with ambient air for generating electrical energy.

During operation of a fuel cell, a reductant, such as, for example, hydrogen, is fed to the at least one anode thereof and an oxidant, such as, for example, ambient air, is fed to the at least one cathode thereof. At the anode, the hydrogen is oxidized catalytically to hydrogen ions with the release of electrons. The hydrogen ions reach the cathode region through an electrolyte that is usually present in the form of a membrane and react there with the air oxygen that is fed to the cathode as well as with the electrons that are conducted to the cathode via an external circuit to form water. During the operation of fuel cells, the switched-off phase is very important for preventing degradation of the fuel cells and thus decreasing the service life thereof. In this case, moisture and residual portions of reaction gases remaining in the fuel cell particularly lead to degradation phenomena in the fuel cell. Beyond this, a storage of the fuel cell at low temperatures, in particular in conjunction with the following startup phase, also leads to a shortening of the service life, in particular owing to an increased degradation of the fuel cell.

It is known that degradation phenomena occurring when the fuel cell is not in the operating phase can be prevented or at least markedly reduced by exchanging reaction gas residues with inert gases as well as by suitable temperature control of the fuel cell during storage and, in this way, the service life of fuel cells can be increased.

SUMMARY OF THE INVENTION

An object of the present invention that ensues from the above is to propose an improved method for operating an energy supply device, which makes it possible to prolong the service life of the at least one fuel cell of the energy supply device. Furthermore, an energy supply device with at least one fuel cell shall be proposed, which makes it possible to prolong the service life of the at least one fuel cell of the energy supply device. This is achieved in accordance with the invention by the teaching of the independent claims. Advantageous embodiments of the invention are the subject of the dependent claims.

Proposed in a first aspect of the invention for achieving this object is a method for operating an energy supply device with at least one fuel cell, the at least one anode of which is supplied with a fuel and the at least one cathode of which is supplied with ambient air for generating electrical energy. By a converter device of the energy supply device, an inert gas and thermal energy are produced from the fuel in this case.

An energy supply device usually has a plurality of fuel cells, which, for example, are arranged in the form of fuel cell stacks. Such a fuel cell arrangement, which, accordingly, has at least one fuel cell, is referred to as "at least one fuel cell" for simplicity in the scope of the description of the invention. Accordingly, the plurality of fuel cells also has a plurality of anodes, which are supplied with a fuel for generating electrical energy, such as, in particular, hydrogen, and a plurality of cathodes, which are supplied with ambient air in order to feed the air oxygen contained therein to the fuel cell as oxidant for generating electrical energy in interaction with the anodes.

It is proposed to produce an inert gas and thermal energy from the fuel and the ambient air by a converter device that is associated with the energy supply device. In this case, the converter device is, in particular, a catalytic converter device; that is, it has a catalyst that promotes the reaction of the fuel with the ambient air. The catalyst can be arranged here, for example, on a metal grid or mesh or else be incorporated in it, around which or through which flow the reaction gases. During operation of the converter device, the fuel reacts with the air oxygen, thereby taking it out of the ambient air. The residual gas that results essentially from the further constituents of the ambient air is composed largely of pure nitrogen and thus of an inert gas. Depending on the desired conversion efficiency, the converter device can also have a post-treatment unit, which removes any portions of non-inert gas contained in the residual gas. The inert gas that is produced and obtained in the converter device can be fed to the fuel cell in order to remove any residual reaction gases often contained in it after the fuel cell has been switched off or else to replace them with the inert gas in order to prevent potential residual reactions inside of the fuel cell.

During the reaction of the fuel with the ambient air that proceeds in the converter device, thermal energy is usually additionally liberated and can be used for temperature control of the fuel cell when the fuel cell is not in an operating phase. If hydrogen is used as the fuel, essentially water and thermal energy are formed during the reaction that proceeds in the converter. The residual gas contains nitrogen as the largest constituent of the ambient air. Whereas the water can be discharged into the surroundings of the fuel cell, the nitrogen can potentially be used together with further residual gas constituents as an inert gas and the thermal energy can be used for temperature control of the generally cold-sensitive fuel cell in order to prevent degradation processes from occurring at the fuel cell and in order to achieve a prolongation of the service life of the fuel cell.

The proposed method makes it possible to prevent critical operating conditions of the at least one fuel cell, which, in particular, can lead to a decrease in performance and a shortening of the service life of the fuel cell. The inert gas that is produced by the converter device can be used to prevent detrimental residual reactions due to reaction gas residues and, by a temperature control of the fuel cell by way of the thermal energy produced, it is also possible to store the fuel cell at low temperatures of less than 5° C., for example, or even at temperatures below the freezing point, without risking any damage to the fuel cell when, in particular, it is started up again.

In one embodiment of the method for operating an energy supply device with at least one fuel cell, the inert gas produced by the converter device, instead of the fuel, is fed to the at least one anode at least intermittently when the at least one fuel cell is switched off and/or when the fuel cell is not in operation. Owing to the inert gas, reaction processes that are potentially still proceeding at the anode when the fuel cell is switched off and/or when the fuel cell is not in operation are stopped, and any possible further or subsequent reaction processes in the fuel cell, which can lead to degradation phenomena, are prevented, in particular at the anode of the fuel cell. In addition, the feeding of an inert gas to the anode can also result in the removal of any moisture still present in the fuel cell, as a result of which further degradation processes that are promoted in the fuel cell by the moisture can be prevented.

In one embodiment of the method for operating an energy supply device with at least one fuel cell, the inert gas produced in the converter device, instead of ambient air, is fed to the at least one cathode at least intermittently when the fuel cell is switched off and/or when the at least one fuel cell is not in operation. Owing to the inert gas, reaction processes that are potentially still proceeding at the cathode when the fuel cell is switched off and/or when it is not in operation are stopped and an inert gas is fed to the cathode, as a result of which further or subsequent degradation processes in the fuel cell, which can lead to degradation phenomena, in particular at the cathode of the fuel cell, can be prevented. In addition, the feeding of an inert gas to the cathode can also result in the removal of any moisture still present in the fuel cell, as a result of which further degradation processes that are promoted in the fuel cell by the moisture can be prevented.

In one embodiment of the method for operating an energy supply device with at least one fuel cell, the at least one fuel cell, when not in operation, is exposed to the thermal energy produced by the converter device. The thermal energy is utilized here for temperature control of cold-sensitive fuel cells when, for example, an aircraft with an energy supply device according to the invention is parked at an airport at low external temperatures of less than 5° C., for example, or even at temperatures below the freezing point. The delivery of thermal energy from the converter device to the fuel cell can bring it to operating temperature prior to restarting it, as a result of which the startup process is improved, and, in addition, potential degradation phenomena at low temperatures can be prevented.

In one embodiment of the method for operating an energy supply device, the energy supply device is used in a flight drive. By the proposed method, inert gas and/or thermal energy can be fed to the energy supply device of the flight drive when the at least one fuel cell is not in operation and any degradation of the at least one fuel cell can thereby be prevented or at least reduced. Beyond this, the proposed energy supply device for generating electrical energy can also be used in the scope of diverse other applications, such as, for example, in drive devices for land vehicles or for water vehicles. In addition, the proposed energy supply device can be used, for example, also for network-independent supply of any consumers, particular those that are stationary or on board an aircraft, or for the base load supply of hybrid drives and/or in the scope of an APU, that is, an auxiliary power unit. The claimed energy supply device is thus suitable, in particular, for use in an aircraft, for a flight drive, or for another flight instrument.

Proposed in a second aspect of the invention for achieving the object is an energy supply device with at least one fuel cell, which has at least one anode that can be supplied with a fuel and at least one cathode that can be supplied with ambient air for generating electrical energy. In this case, the energy supply device has a converter device, by which an inert gas and thermal energy can be produced from the fuel and from the ambient air.

The at least one fuel cell of such an energy supply device has already been described previously in connection with the method for operating an energy supply device with at least one fuel cell. The features and properties mentioned there also relate to the at least one fuel cell of the energy supply device proposed below. Furthermore, the energy supply device has a converter device, by which an inert gas and thermal energy can, in particular, be produced from the fuel provided for the fuel cell and from ambient air. Such a converter device can be associated in each instance, for example, with a fuel cell arrangement or a plurality of fuel cell arrangements. Accordingly, a plurality of fuel cell arrangements can also have a plurality of converter devices. On the other hand, one converter device can be associated with a plurality of fuel cells or else an energy supply device can also have only one converter device or a plurality of converter devices.

As already previously described, the converter device can be, in particular, a catalytic converter device, which has a catalyst for promoting the reaction of the fuel with the ambient air. In this case, the catalyst can be arranged on a metal grid or mesh or else be incorporated in it, through which or around which flow the reaction gases. During operation of the converter device, the fuel reacts with the air oxygen, which is taken from the ambient air. The remaining residual gas here generally is composed largely of pure nitrogen and thus represents an inert gas. Depending on the desired conversion efficiency, the converter device can also have a post-treatment unit, which removes any portions of non-inert gas contained in the residual gas. The inert gas obtained can be fed to the fuel cell in order to remove or to replace with inert gas any potential residual reaction gases present after the fuel cell has been switched off so as to prevent potential residual reactions inside of the fuel cell. In particular, the inert gas is fed to the at least one anode and/or cathode of the fuel cell, whereby inert gas flows through the gas-feeding spaces of the anode or anodes and cathode or cathodes, in particular, in order to expel the residual gases (fuel and ambient air) contained in them and/or moisture from the fuel cell.

During the reactions of the fuel with the ambient air that proceed in the converter device, thermal energy is also generally liberated and can be used for temperature control of the fuel cell when it is not in an operating phase. If, for example, hydrogen is used as the fuel, water, nitrogen, and thermal energy are formed during the reaction proceeding in the converter. Whereas the water can be discharged into the surroundings of the fuel cell, the nitrogen can be used as an inert gas and the thermal energy can be used for temperature control of the cold-sensitive fuel cell in order to prevent degradation processes at the fuel cell and in order to achieve a prolongation of the service life of the fuel cell.

The proposed energy supply device makes it possible to produce an inert gas and thermal energy by the converter device. The inert gas and the thermal energy can be used advantageously when the fuel cell is switched on and/or off as well as when it is stored during an interruption in operation, in order to prevent critical operating conditions of the at least one fuel cell, which, in particular, can lead to a decrease in performance and a shortening of the service life of the fuel cell. It is thereby possible to use the inert gas that is produced by the converter device to prevent detrimental residual reactions due to gas residues and, by a temperature control of the fuel cell by using the produced thermal energy, it is also possible to store the fuel cell at low ambient temperatures of less than 5° C., in particular, without risking any damage to the fuel cell, in particular when it is started up again.

In one embodiment, the energy supply device has a converter cooling circuit, by which the thermal energy can be dissipated from the converter device. In this way, it is possible to prevent any overheating of the converter device and the thermal energy can be used, in particular, for a temperature control of the at least one fuel cell. In this case, the converter cooling circuit can be, in particular, part of the cooling circuit of the energy supply device. The converter cooling circuit here can also be designed in such a way that it can be operated independently of the cooling circuit of the energy supply device.

In one embodiment, it is possible to feed the thermal energy that is dissipated in the converter device to the at least one fuel cell via a cooling circuit. In this case, by the converter cooling circuit, the thermal energy that is dissipated from the converter device is fed to the at least one fuel cell in order to control its temperature or to preheat it when it is stored at low ambient temperatures, or, for example, prior to its startup.

In one embodiment, the energy supply device has an inert gas feeding device, by which the inert gas in the form of nitrogen, for example, that is produced in the converter device can be fed to the anode and/or to the cathode. In this case, the inert gas feeding device can be designed in such a way that the inert gas can be fed into the fuel feed line to the anode and/or into the feed line for ambient air to the cathode. In this way, it is possible for inert gas to flow through the regions of the fuel cell to which fuel or ambient air is fed during operation of the fuel cell in order to replace residual gases and any moisture that is present with inert gas. Furthermore, any residual reactions that are proceeding and, in particular, are detrimental to the fuel cell can thereby be interrupted. It is equally possible to design the inert gas feeding device to be independent of the feed devices of the reaction gases in order to feed inert gas to the fuel cell so as to prevent any degradation. In particular, the inert gas feeding device can have a control or regulating device, which controls or regulates the feed of inert gas to the anode and/or to the cathode both with respect to time and also with respect to mass flow.

In one embodiment of the energy supply device, the energy supply device is part of a flight drive. The proposed converter device, by which inert gas and thermal energy can be produced from the fuel and the ambient air, can be used to feed inert gas and/or thermal energy to the energy supply device of the flight drive when the at least one fuel cell is not in operation and thereby to prevent or at least to reduce any degradation of the at least one fuel cell. Beyond this, the proposed energy supply device for generating electrical energy can be used in the scope of diverse supplications, such as, for example, in drive devices for land vehicles or for water vehicles. In addition, the proposed energy supply device can be used, for example, also for network-independent supply of any consumers, particular those that are stationary or on board an aircraft, or for the base load supply of hybrid drives and/or in the scope of an APU, that is, an auxiliary power unit.

Further proposed for achieving the object is to use an energy supply device that is designed in accordance with one embodiment or a plurality of embodiments of the preceding description for carrying out the method for operating an energy supply device with at least one fuel cell, whereby the method is designed in accordance with the preceding description. In this way, it is possible, in particular with respect to the service life, to prevent critical operating conditions of such an energy supply device with at least one fuel cell, as a result of which the performance thereof is retained for a longer time.

BRIEF DESCRIPTION OF THE DRAWING FIGURES

Figure 2:
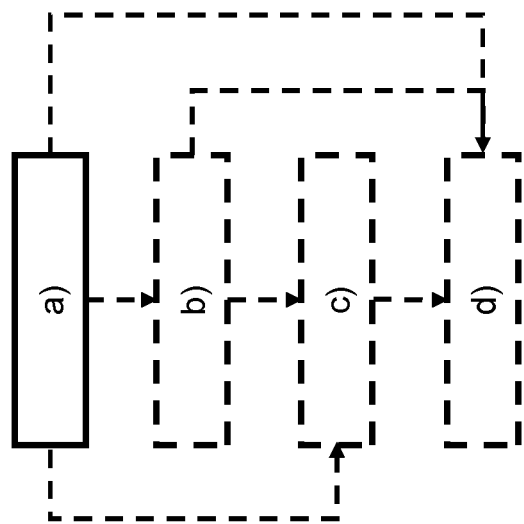

Further features, advantages, and possible applications of the invention ensue from the following description in connection with the figures. Shown are:

FIG. 1 which is a schematic illustration of an exemplary energy supply device according to the invention; and FIG. 2 which is a schematic illustration of a flow chart of the method according to the invention for operating an energy supply device with at least one fuel cell.

DESCRIPTION OF THE INVENTION

FIG. 1 shows a schematic illustration of an exemplary energy supply device 11 according to the invention. The at least one anode 12 of the fuel cell 10 is supplied with a fuel via a fuel feed line 13 depicted in FIG. 1 with thin solid lines. In the energy supply device 11 described in the exemplary embodiment, hydrogen, which is stored in a hydrogen tank 23, is fed in as the fuel.

The at least one cathode 14 of the fuel cell 10 is supplied with ambient air via an air feed line 15, depicted in FIG. 1 by thick solid lines. The ambient air 25 taken from the surroundings or the oxygen contained therein serves as an oxidant for the production of drive energy by the fuel cell 10. The energy supply device 11 further has a converter device 30, to which fuel and ambient air are fed and which serves for producing an inert gas and thermal energy.

Fuel—hydrogen in the exemplary embodiment, given by way of example—is fed to the converter device 30 of the energy supply device 11 via a fuel feed line 17. Furthermore, ambient air as oxidant is fed to the converter device 30 via the air feed line 18, so that, in the converter device 30, the hydrogen can react with the air oxygen, whereby the inert gas nitrogen and water are formed with liberation of heat. The water can simply be discharged to the surroundings. The converter device 30 is connected to an inert gas feeding device 38, which, in FIG. 1, is drawn in the form of a dotted line. Via the inert gas feeding device 38, it is possible to feed the nitrogen that is formed in the converter device to the anode 12 and/or to the cathode 14. Accordingly, nitrogen can flow through the regions of the fuel cell 10 to which fuel or ambient air is fed during operation of the fuel cell, in order to replace any residual gases and any possibly present moisture with an inert gas. In this case, remaining hydrogen can be discharged directly into the surroundings 26.

The energy supply device 11 further has a cooling circuit 32, by which thermal energy can be dissipated from a temperature control device 33 that is arranged in the region of the fuel cell 10. In FIG. 1, the cooling circuit 32 is depicted schematically by dashed lines. The cooling circuit 32 has a heat exchanger 34, via which, in particular during operation of the fuel cell, excess thermal energy that is generated can be dissipated from the cooling circuit 32. In particular, when the fuel cell 10 is not in operation, it is possible to feed thermal energy produced by the converter device 30 to the cooling circuit 32. By way of example, in the exemplary embodiment, this is done by a heat exchanger 35, which dissipates thermal energy from the inert gas produced by the converter device 30 and fed to the anode 12 and/or to the cathode 14 of the fuel cell 10. This thermal energy is delivered to a converter cooling circuit 36, designed in the exemplary embodiment by way of example, which is part of the cooling circuit 32 of the energy supply device 11 and is depicted schematically in FIG. 1 by thick dashed lines. Via the converter cooling circuit 36, the thermal energy is dissipated from the converter device 30 to the temperature control device 33 of the fuel cell 10 in order to protect the fuel cell 10, in particular when the fuel cell 10 is stored in a switched-off state, from temperatures near or below the freezing point, or in order to preheat the fuel cell 10 prior to its being switched on so as, in this way, to prevent degradation phenomena and thus to prolong the service life of the fuel cell 10.

FIG. 2 shows a schematic illustration of a flow chart of the method according to the invention for operating an energy supply device 11 with at least one fuel cell 10, the at least one anode 12 of which is supplied with a fuel and the at least one cathode 14 of which is supplied with ambient air for generating drive energy. In the method according to the invention, in a step a), an inert gas and thermal energy are produced from the fuel by a converter device 30 of the energy supply device 11.

In a further and, in particular, optional step b), inert gas formed in the converter device 30 is fed to the at least one anode 12 at least intermittently when, for example, the at least one fuel cell 10 is switched off and/or is not in operation and, as chosen, in a further step c), inert gas formed in the converter device 30 is fed to the at least one cathode 14 at least intermittently when the at least one fuel cell 10 is switched off and/or is not in operation.

In an optional implementation of the method, in a step d), the at least one fuel cell 10 is exposed to thermal energy produced in the converter device 30, in particular when the fuel cell is not in operation. In particular, the energy supply device 11 depicted schematically in FIG. 1 is suitable for carrying out the method described in FIG. 2.

What is claimed is:

1. A method for operating an energy supply device with at least one fuel cell, at least one anode of which is supplied with fuel and at least one cathode of which is supplied with ambient air for generating electrical energy, by a converter device of the energy supply device, inert gas and thermal energy are produced from the fuel and the ambient air,
the energy supply device is used in a flight drive and the converter device is a catalytic converter device, which has a catalyst that promotes the reaction of the fuel with the ambient air, and wherein the catalyst is arranged on a metal grid or mesh or is incorporated in it, through which or around which flow the reaction gases;
wherein inert gas produced by the converter device, instead of the fuel, is fed to the at least one anode at least intermittently when the at least one fuel cell is switched off and/or is not in operation; and
wherein the inert gas produced from the fuel and the ambient air by the converter device, instead of ambient air, is fed to the at least one cathode at least intermittently when the at least one fuel cell is switched off and/or is not in operation.

2. The method for operating an energy supply device with at least one fuel cell according to claim 1, wherein the at least one fuel cell, when it is not in operation, is loaded with the thermal energy that is produced by the converter device.

3. An energy supply device with at least one fuel cell, which has at least one anode that can be supplied with a fuel and at least one cathode that can be supplied with ambient air for generating electrical energy as well as a converter device, by which inert gas and thermal energy is produced from the fuel and the ambient air,
wherein the energy supply device is used in a flight drive and the converter device is a catalytic converter device, which has a catalyst that promotes the reaction of the fuel with the ambient air, and wherein the catalyst is arranged on a metal grid or mesh or is incorporated in it, through which or around which can flow the reaction gases;
wherein an inert gas feeding device, by which the inert gas produced in the converter device is fed to the anode when the at least one fuel cell is switched off and/or is not in operation; and
wherein an inert gas feeding device, by which the inert gas produced in the converter device is fed to the cathode when the at least one fuel cell is switched off and/or is not in operation.

4. The energy supply device according to claim 3, further comprising a converter cooling circuit, by which the thermal energy is dissipated from the converter device.

5. The energy supply device according to claim 4, wherein the thermal energy dissipated from the converter device is fed to the at least one fuel cell via the converter cooling circuit.

6. The energy supply device according to claim 3, for generating electrical energy in an aircraft engine,
wherein the energy supply device is used for the network-independent supply of any consumer on board an aircraft and/or in the scope of an auxiliary power unit.

7. The energy supply device according to claim 3, is configured and arranged for carrying out a method for operating an energy supply device.

8. The energy supply device according to claim 3 is configured and arranged for use in an aircraft engine.

* * * * *